J. A. TUPPER.
MEASURING DEVICE.
APPLICATION FILED DEC. 11, 1919.
1,372,849.
Patented Mar. 29, 1921.
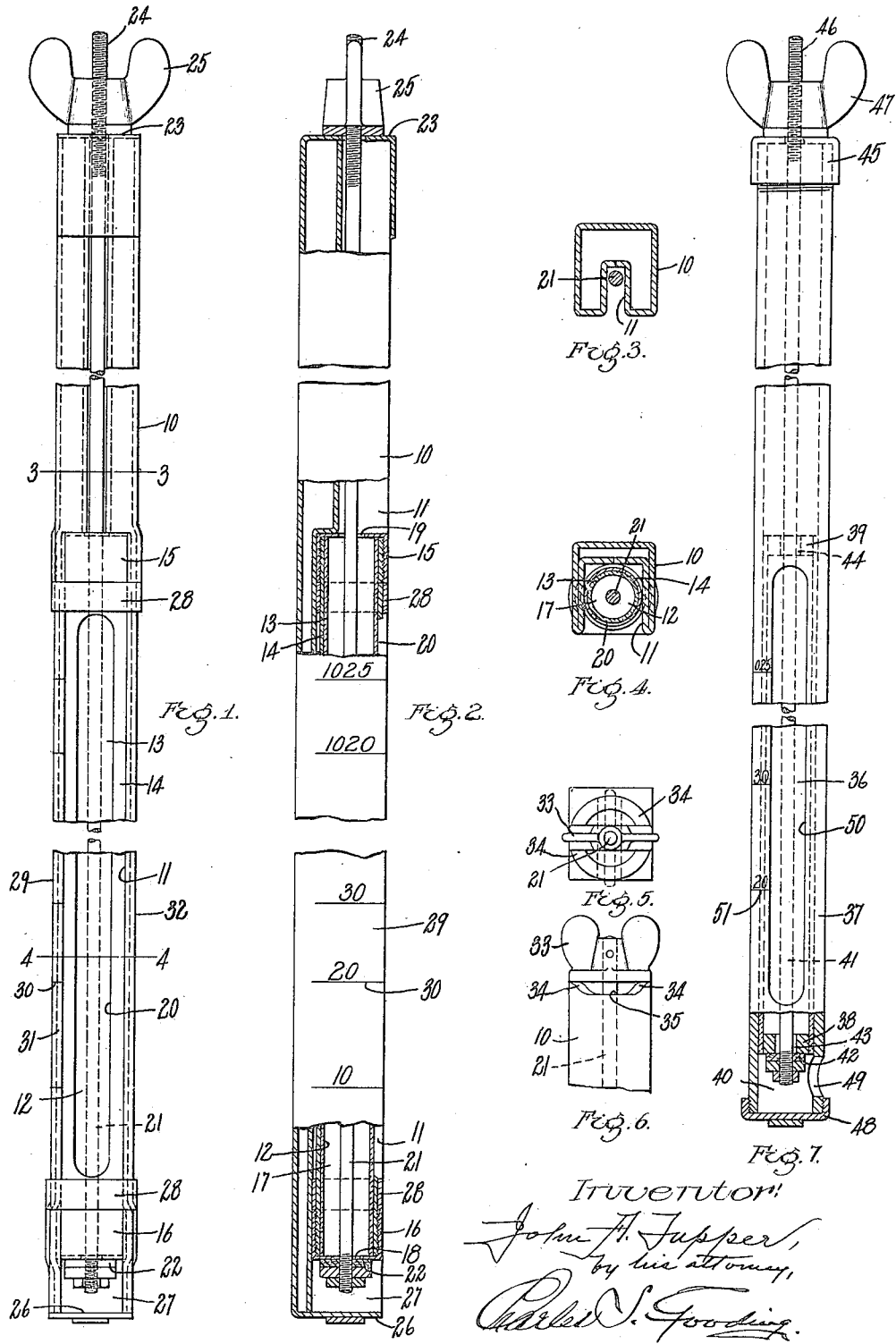

UNITED STATES PATENT OFFICE.

JOHN A. TUPPER, OF CAMBRIDGE, MASSACHUSETTS.

MEASURING DEVICE.

1,372,849.  Specification of Letters Patent.  Patented Mar. 29, 1921.

Application filed December 11, 1919. Serial No. 344,076.

*To all whom it may concern:*

Be it known that I, JOHN A. TUPPER, a citizen of the United States, residing at Cambridge, in the county of Middlesex and State of Massachusetts, have invented new and useful Improvements in Measuring Devices, of which the following is a specification.

This invention relates to measuring devices and has for its object to provide a device which will accurately measure the quantity of liquids contained in tanks.

So far as I am aware, it has generally been the custom in measuring the amount of certain liquids, particularly kerosene, gasolene and the like which are stored in tanks for sale, to use a long slender gage properly graduated which may be inserted into the tank until it contacts with the bottom thereof and upon withdrawing said gage to determine the amount of liquid within said tank by the moisture level upon said gage. This method of measuring liquids, however, is open to objections as a sidewise movement may be given to said gage, either by accident or design, after it has been inserted in the liquid and the movement of said liquid will make it appear from the resulting moisture level upon the gage that there is more liquid within the tank than is actually the case.

It is, therefore, an object of this invention to eliminate the necessity of depending upon the doubtful moisture level and provide a device that cannot be influenced by shaking, which may be inserted within a tank and into which the liquid may rise to the exact level of the liquid within the tank, whereupon a valve may be operated to retain said liquid within said device which may then be removed from the tank thereby transferring from said tank a column of liquid corresponding in height to the actual level of the liquid within the tank.

The invention consists in the combination and arrangement of parts set forth in the following specification and particularly pointed out in the claims thereof.

Referring to the drawings:

Figure 1 is a front elevation of my improved measuring device, the same being broken away at intervals in order that space may be saved in the drawings.

Fig. 2 is a side elevation partly broken away and illustrated in section, as viewed from the left hand side of Fig. 1.

Fig. 3 is a horizontal section taken on the line 3—3 of Fig. 1.

Fig. 4 is a horizontal section taken on the line 4—4 of Fig. 1.

Figs. 5 and 6 are detail views illustrating a modified construction which may be used for operating the valve of my invention.

Fig. 7 is a front elevation partially broken away and shown in section, illustrating a modified embodiment of my invention.

Like numerals refer to like parts throughout the several views of the drawings.

In the drawings, Figs. 1 to 4 inclusive, 10 represents a gage preferably constructed of sheet metal to insure strength, although it may be constructed of wood if it is so desired. The gage is approximately square in horizontal cross section and of such length as the requirements of the various types and sizes of tanks may demand.

The gage 10 is provided with a recess 11 extending longitudinally thereof for its entire length, within the lower portion of which is located a liquid receptacle 12. The liquid receptacle 12 comprises a transparent tube 13 adapted to fit the interior of a metal tube 14 which serves to strengthen said transparent tube 13, and caps 15 and 16 which have screw-threaded engagement with the upper and lower ends respectively of said metal tube 14 and thereby provide a top and bottom respectively for said liquid receptacle 12. The caps 15 and 16 also serve to retain said transparent tube 13 within the metal tube 14.

The interior of the transparent tube 13 constitutes a liquid chamber 17. Liquid has access to the chamber 17 through a port 18 provided in the cap 16, while an aperture 19 provided in the cap 15 serves to allow air within the chamber 17 to escape as the liquid rises within said chamber 17. An opening 20 extends longitudinally of the metal tube 14 for approximately its entire length and provides an opportunity for observing the level of the liquid within the chamber 17. Extending through the interior of the liquid receptacle 12 upon the median line thereof is a valve stem 21, to the lower end of which is fastened a valve 22 which is adapted to seat against the end surface of the cap 16 and thereby close the port 18. The valve stem 21 extends upwardly through the chamber 17 passing outwardly therefrom through the aperture 19 and thence extends upwardly through the upper portion of the recess 11 protruding through the upper end 23 of the gage 10 and terminating in a screw-threaded portion 24 upon which a thumb nut 25 is adapted to turn.

The liquid receptacle 12 is positioned in the recess 11 a sufficient distance above the lower end 26 of the gage 10 to provide a space 27 in which the valve 22 is located, the amount that said valve may drop being limited by the end 26 of the gage 10.

Bands 28 which extend across the recess 11 in front of the liquid receptacle 12 near its upper and lower ends prevent said liquid receptacle from becoming dislodged from its proper position in the recess 11.

A surface 29 of the gage 10 has indicated thereon suitable graduations 30 which are also extended across a narrow front edge 31 adjacent to the liquid receptacle 12. These graduations are suitably numbered to indicate the amount of liquid which would be contained within the tank at the various levels corresponding to the graduations 30.

The operation of my improved measuring device is as follows: When it is desired to ascertain the quantity of a certain liquid contained within a tank, the measuring device which is especially adapted for said tank is inserted therein and lowered until it contacts with the bottom of said tank, the port 18 at the lower end of the liquid receptacle 12 may be opened prior to the time that the measuring device is inserted in the tank, or after said measuring device is in its proper position therein, in either event this is accomplished by loosening the thumb nut 25 at the upper end of the valve stem 21, thereby causing the valve 22 to drop in the space 27. This will allow the liquid within the tank to flow through the port 18 and thence rise in the liquid chamber 17 until it reaches a level in said chamber equal to the level of the liquid in the tank. As the liquid rises in the chamber 17, the air in said chamber will pass outwardly through the aperture 19 at the upper end thereof. The port 18 is then closed by turning the thumb screw 25 in the proper direction thereby causing the valve 22 to again contact with the underside of the cap 16. With the liquid thus held within the chamber, the measuring device is withdrawn from the tank and the quantity of the liquid within said tank is ascertained by comparing the level of the column of liquid within the liquid receptacle with the graduations upon the adjacent surface of the gage.

The measuring device may be adapted to tanks of all sizes and capacities, it being evident that a separate measuring device is required for each size of tank.

In Figs. 5 and 6 an alternative construction is illustrated for opening and closing the port 18. In this construction a thumb nut 33 is fastened rigidly to the upper end of the valve stem 21, it being necessary to turn said thumb nut through an angle of only 90° in order to open the port 18 when the port is closed. The thumb nut 33 rests upon two coöperating cam surfaces 34 formed at the upper end of the gage 10. When the thumb nut 33 is turned it will slide down the inclines of said cams and rest upon the upper end 35 of said gage, thereby operating the valve 22 to open the port 18. With this construction the valve 22 will be caused to move a definite amount in either direction each time that the thumb nut 33 is turned through an angle of 90°.

In Fig. 7 is illustrated another embodiment of my invention. In this embodiment a transparent tube 36 is inserted within a metal tube 37, the said metal tube not only serving the purpose of the metal tube 14 previously described, but also being of sufficient strength and length to also act as the gage.

The ends of the transparent tube 36 are closed by plugs 38 and 39 and its lower end is a sufficient distance above the lower end of the metal tube 37 to provide a space 40 into which the liquid may flow. A valve stem 41 extends through the transparent tube 36 upon the median line thereof and has fast at its lower end a valve 42 which is adapted to open and close a port 43. The valve stem 41 emerges from the transparent tube 36 through an aperture 44 and thence extends upwardly upon the median line of the metal tube 37 projecting through a cap 45 upon the upper end thereof and terminating in a screw-threaded portion 46 upon which a thumb nut 47 is mounted. The lower end of the metal tube 37 is closed by a cap 48. Liquid enters the space 40 through an opening 49. The level of the liquid within the transparent tube 36 may be observed through an opening 50 provided in the metal tube 37, said opening extending longitudinally of said transparent tube for approximately its entire length. Suitable graduations 51 are placed upon the metal tube 37 adjacent to the opening 50.

The operation of the device illustrated in Fig. 7 is exactly the same as that previously described in connection with Figs. 1 to 4 inclusive.

Having thus specifically described my invention, what I claim and desire by Letters Patent to secure is:

1. A measuring device for liquids having, in combination, a gage provided with graduations thereupon adapted to indicate the capacity of a tank, said gage being provided with a recess extending longitudinally thereof, a metal tube located within said recess, a transparent tube located within said metal tube, means to retain said transparent tube within said metal tube, said metal tube being provided with an opening extending longitudinally thereof, whereby liquid within said transparent tube may be observed, a valve located at the lower end of said transparent tube, and means to operate said valve.

2. A measuring device for liquids having, in combination, a gage provided with graduations thereupon adapted to indicate the capacity of a tank, said gage being provided with a recess extended longitudinally thereof, a metal tube located within said recess, a transparent tube located within said metal tube, means to retain said transparent tube within said metal tube, said metal tube being provided with an opening extending longitudinally thereof, whereby liquid within said transparent tube may be observed, a valve located at the lower end of said transparent tube, a valve stem extending through said transparent tube, and means located upon said valve stem at the upper end of said gage adapted to operate said valve.

3. A measuring device for liquids having, in combination, a gage provided with graduations thereon adapted to indicate the capacity of a tank, said gage being provided with a recess extending longitudinally thereof, a metal tube located within said recess, a transparent tube located within said metal tube, means to retain said transparent tube within said metal tube, said metal tube being provided with an opening extending longitudinally thereof, whereby liquid within said transparent tube may be observed, a valve located at the lower end of said transparent tube, a valve stem extending through said transparent tube and a thumb nut having screw-threaded engagement with said valve stem at the upper end thereof, the valve being opened and closed by the rotation of said thumb nut upon said valve stem.

4. A measuring device for liquids having, in combination, a casing constructed of sheet metal and constituting a gage upon which are provided graduations adapted to indicate the capacity of a tank, said gage being provided with a recess extending longitudinally thereof, a metal tube located within said recess, a transparent tube located within said metal tube, means to retain said transparent tube within said metal tube, said metal tube being provided with an opening extending longitudinally thereof whereby liquid within said transparent tube may be observed, a valve located at the lower end of said transparent tube, a valve stem extending through said transparent tube and means located upon said valve stem at the upper end of said gage adapted to operate said valve.

5. A measuring device for liquids having, in combination, a gage provided with graduations thereon adapted to indicate the capacity of a tank, said gage being provided with a recess extending longitudinally thereof, a metal tube located within said recess, a transparent tube located within said metal tube, a pair of caps, said caps being secured to the upper and lower ends of said metal tube and adapted to retain said transparent tube within said metal tube, said metal tube being provided with an opening extending longitudinally thereof whereby liquid within said transparent tube may be observed, the cap at the lower end of said metal tube being provided with a port therein, a valve for said port, a valve stem extending through said transparent tube and means located upon said valve stem at the upper end of said gage adapted to operate said valve.

In testimony whereof I have hereunto set my hand in presence of two subscribing witnesses.

JOHN A. TUPPER.

Witnesses:
FRANKLIN E. LOW,
HERMAN R. HOFFMAN.